United States Patent [19]

Leopold

[11] 3,923,832
[45] Dec. 2, 1975

[54] INSECTICIDAL SUBSTITUTED ALKENES
[75] Inventor: Eric Jan Leopold, Palo Alto, Calif.
[73] Assignee: Eli Lilly and Company, Indianapolis, Ind.
[22] Filed: Apr. 27, 1973
[21] Appl. No.: 354,970

[52] U.S. Cl. ....... 260/340.5; 260/332.2; 260/332.3; 260/332.5; 260/340.3; 260/347.4; 260/347.7; 260/347.8; 260/465; 260/469; 260/612; 260/613; 260/645; 260/476; 260/576; 260/649; 260/646; 260/669; 424/278; 424/282
[51] Int. Cl.² ............... C07D 317/50; C07D 319/18
[58] Field of Search ...................... 260/340.5, 340.3

[56] References Cited
OTHER PUBLICATIONS
Gokhale et al. Chemical Abstracts Vol. 43 (1949) p. 1085.
Loev et al. Chemical Abstracts Vol. 51 (1957) pp. 1074–1075.
Atal et al. Chemical Abstracts Vol. 69 (1968) p. 10150.

Primary Examiner—James A. Patten
Attorney, Agent, or Firm—Joseph A. Jones; Everet F. Smith

[57] ABSTRACT

Novel 1,7-dienes and addition products thereof possessing juvenile hormone-like activity have been prepared. Such a compound is one having the formula

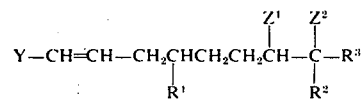

wherein each of $R^1$, $R^2$ and $R^3$ can be hydrogen or $C_1$–$C_3$ alkyl, and $Z^1$ and $Z^2$ separately can be hydrogen or halogen or together can be a carbon to carbon bond, and Y is thienyl, furyl, naphthyl, phenyl or phenyl substituted by one or two substituents selected from chloro, bromo, fluoro, carboethoxy, cyano, $C_1$–$C_4$ alkyl, $C_1$–$C_3$ alkoxy, nitro, methylenedioxy, ethylenedioxy, dimethylamino or diethylamino. A compound exemplary of my invention is 4,8-dimethyl-1-(3,4-methylenedioxyphenyl)-1,7-nonadiene.

2 Claims, No Drawings

INSECTICIDAL SUBSTITUTED ALKENES

BACKGROUND OF THE INVENTION

My invention pertains to compounds which exhibit juvenile hormone-like activity. More particularly, the compounds are characterized by a long carbon chain containing at least eight carbon atoms to which is attached a thiophene, furan, naphthalene, benzene or substituted benzene ring.

It is well known that insect populations can be controlled by treating a metamorphic stage of the insect with a juvenile hormone to prevent passage of the insect to a subsequent metamorphic stage. As a result of such treatment the insect will not achieve full maturity. The structure of two such hormones, Juvenile Hormones I and II, are shown below.

A series of synthetically prepared compounds having

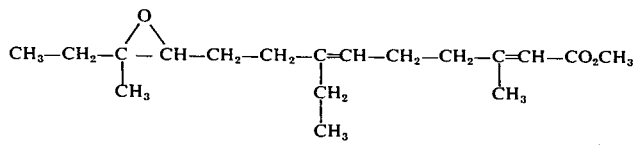

I

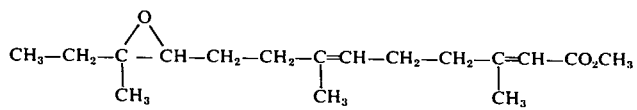

II juvenile hormone-like activity are described in South African Patent No. 67/5149. These compounds, like the naturally occurring hormones, have a straight-chain carbon skeleton. This carbon skeleton is terminated by such groups as ester, hydroxy, halo, and amino.

Wigglesworth, *J. Ins. Physiol.*, 9, 105 (1963), reported that dendrolasin exhibits some juvenile hormone activity. Dendrolasin, a compound secreted by the mandibular gland of the ant, is 9-(2-furyl)-2,6-dimethyl-2,6-nonadiene.

In the course of synthetic studies in the diterpene series Nasipuri et al., *J. Chem. Soc.*, 1964, 2146, prepared 9-(3-methoxyphenyl)-2,6-dimethyl-2,6-nonadiene by means of the Wittig reaction. There was no suggestion that the compound possessed biological activity.

Schwarz et al., *Life Sciences*, 10, Part II, 1125 (1971) synthesized a series of epoxidized terpenoid aromatic "hybrids" which exhibited activity as juvenile hormone mimics.

In U.S. Pat. No. 3,563,982, and pending application Ser. No. 187,890, filed Oct. 8, 1971, various 2,6-dienes are described as juvenile hormone mimics.

SUMMARY

I have now discovered a class of compounds having juvenile hormone-like activity. My compounds comprise a hydrocarbon chain of at least eight carbon atoms, to which is attached a thiophene, furan, naphthalene, benzene or substituted benzene ring.

DESCRIPTION OF THE PREFERRED EMBODIMENT

The compounds of my invention are those having the following formula

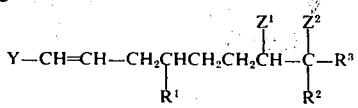

wherein each of $R^1$, $R^2$ and $R^3$ is independently hydrogen or a $C_1$–$C_3$ alkyl group, $Z^1$ and $Z^2$ are each separately a hydrogen or a halogen, or taken together are a carbon to carbon bond, and Y is thienyl, furyl, naphthyl, phenyl or phenyl substituted by one or two substituents from the group consisting of chloro, bromo, fluoro, carboethoxy, cyano, $C_1$–$C_4$ alkyl, $C_1$–$C_3$ alkoxy, nitro, methylenedioxy, ethylenedioxy, dimethylamino and diethylamino.

For example, each of $R^1$, $R^2$ and $R^3$ may be such groups as methyl, ethyl, n-propyl, and isopropyl. It is to be understood that all R groups need not be the same in a particular molecule but that each R can take a value independent of the others. $Z^1$ and $Z^2$ taken separately can each independently be hydrogen or halogen. Halogens which may be employed include chlorine, bromine, iodine and fluorine, although chlorine is preferred. $Z^1$ and $Z^2$ taken together may be a carbon to carbon bond, in which event there is a double bond between the carbon atoms to which $Z^1$ and $Z^2$ are attached.

Y represents thienyl, furyl, naphthyl, phenyl or substituted phenyl, such as 4-cyanophenyl, 4-dimethylaminophenyl, 3,4-dimethoxyphenyl, 4-carboethoxyphenyl, 4-fluorophenyl, 4-isopropylphenyl, 3-nitrophenyl, 4-ethylphenyl, 2-chloro-4-nitrophenyl, 3,4-methylenedioxyphenyl, 2,6-dichlorophenyl or 4-methyl-2-nitrophenyl.

Representative of the compounds within the scope of this invention are the following.

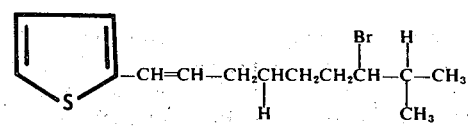

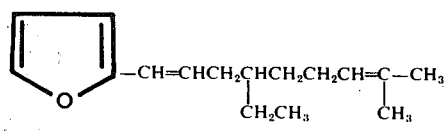

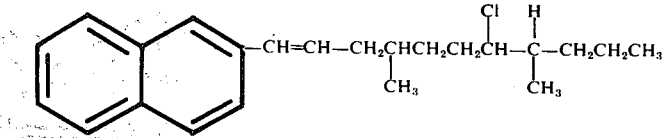

-continued

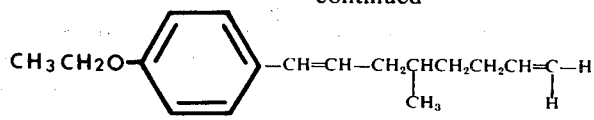

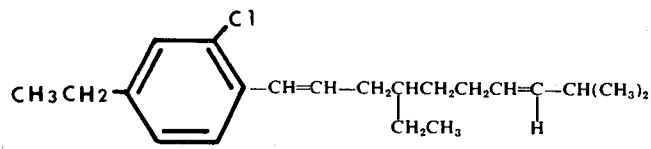

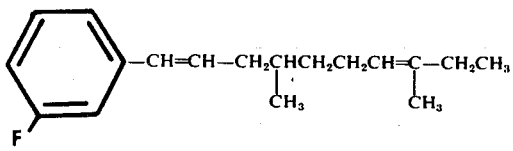

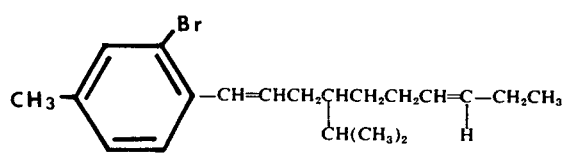

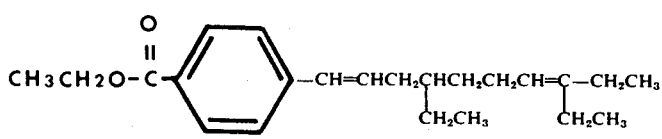

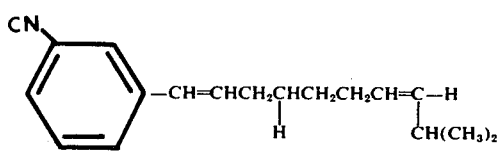

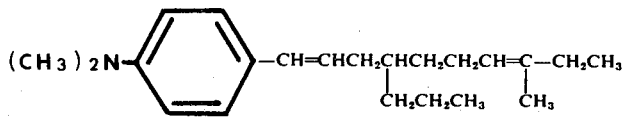

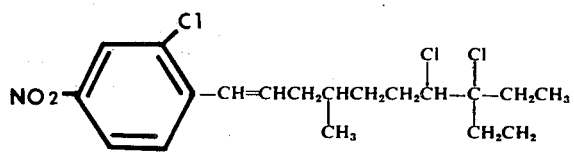

The preferred compounds of my invention are those in which $R^1$, $R^2$ and $R^3$ are methyl or ethyl, $Z^1$ and $Z^2$ together are a carbon to carbon bond, and Y is 3,4-methylenedioxyphenyl, 3,4-ethylenedioxyphenyl, 4-chlorophenyl or 4-bromophenyl. The trans isomers of the unsaturated compounds are preferred over the cis isomers. Particularly preferred are the compounds having the following structures.

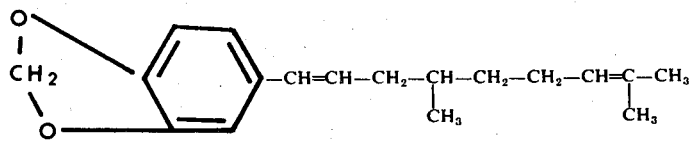

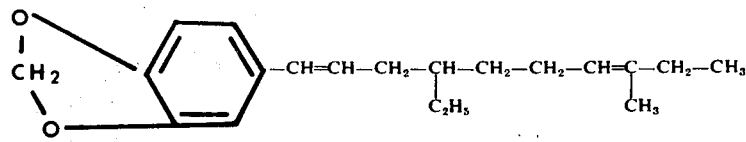

—Continued

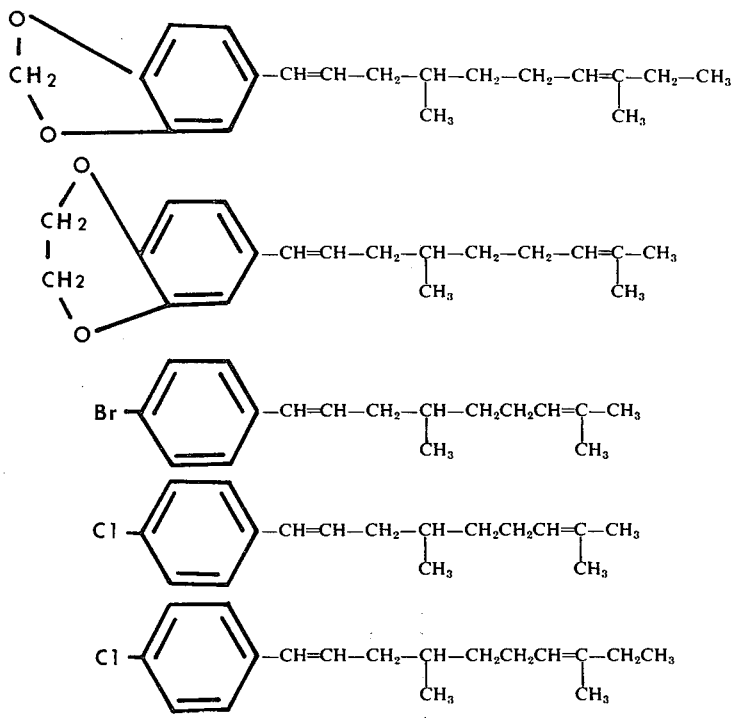

Some of the compounds of my invention are prepared by a three step synthesis starting from the proper long chain alcohol. Such long chain alcohols of the formula

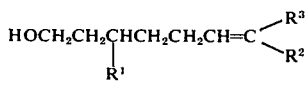

wherein $R^1$, $R^2$ and $R^3$ have the meanings previously described, are naturally-occurring or can be prepared by known procedures in the scientific literature.

The first step of my synthesis involves the conversion of such long chain alcohols as described above to a corresponding halo compound by replacing the hydroxyl group with a halogen, preferably bromine or chlorine. The halogenation may be accomplished by the use of reagents such as $PBr_3$, $PCl_3$, $POCl_3$ or $PCl_5$. Generally the halogenation is done in an aprotic solvent such as dichloroethane, pyridine, carbon tetrachloride or chloroform. One skilled in the art would realize, however, that there are other possible reagents for the conversion of an aliphatic alcohol to an aliphatic halide. I have had the most success using phosphorous tribromide in pyridine at temperatures between −20° and 10°C.

The second step of my process employs the well-known Grignard coupling reaction. The aliphatic halide obtained in step 1 is reacted with magnesium metal to give the Grignard reagent which in turn reacts with an aldehyde, Y—CHO, wherein Y is as previously described, to yield an appropriately substituted secondary alcohol. Ethyl ether is generally used as a solvent, although numerous modifications to the well-known Grignard reaction are possible. For a discussion of some of the possible modifications of the Grignard synthesis, see M. S. Karasch and O. Reinmuth, *Grignard Reactions of Nonmetallic Substances*, Prentice-Hall Inc., New York, 1954.

The final step in my process involves the dehydration of the alcohol obtained in the second step to give the desired compounds possessing juvenile hormone-like properties. Dehydration may be accomplished by a dehydrating agent in the presence of a hydrogen halide acceptor that will not react with the dehydrating agent.

A hydrogen halide acceptor is a compound which will remove the hydrogen halide generated during the reaction. Some examples are pyridine, sodium carbonate and tertiary amines, especially triethylamine. Possible dehydrating agents are $H_2SO_4$, $KHSO_4$, $PBr_3$, $P_2O_5$ and preferably p-toluenesulfonyl chloride in the presence of pyridine. The reaction is conveniently carried out by heating between 100° and 150°C. for a period of one to five hours. Other procedures are also possible, for example, the procedure of Traynelis et al., *J. Org. Chem.*, 27, 2377 (1962), using dimethylsulfoxide at 160°C.

My compounds can also be prepared by a method I shall refer to as the "phosphonate route." This route is depicted by the following equations.

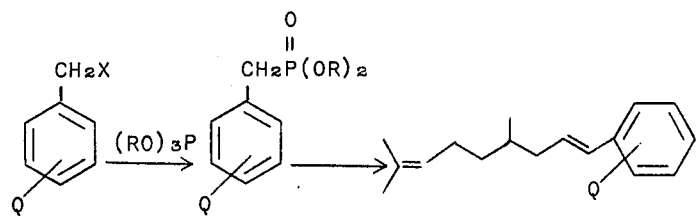

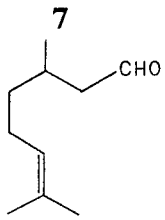

In the equations above, X is chlorine or bromine, R is lower alkyl and Q represents one or two substituents chosen from chlorine, fluorine, bromine, carboethoxy, cyano, $C_1$–$C_4$ alkyl, $C_1$–$C_3$ alkoxy, nitro, methylenedioxy, ethylenedioxy, dimethylamino and diethylamino. The reaction sequence is stereoselective and gives almost exclusively trans isomer.

The first step in the phosphonate route is the well-known Arbusov reaction forming a benzyl phosphonate through the reaction of an α-halotoluene with a trialkyl phosphite. Lower trialkyl phosphites ($C_1$–$C_3$) are preferred, since the volatility of the by-product drives the reaction to completion. The reaction can be carried out in an aprotic solvent or neat, with heating between 70° and 150°C., conveniently at the boiling point of the chosen trialkyl phosphite.

In the second step of this route, the benzyl phosphonate obtained in the first step is reacted with an alkali metal hydride or amide, for example, sodium hydride, potassium hydride or lithium amide, and an aldehyde of the formula

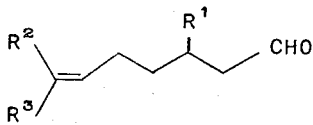

wherein $R^1$, $R^2$ and $R^3$ are as previously described. Such aldehydes are naturally occurring or can be prepared by known procedures in the scientific literature. The reaction can be carried out in various aprotic solvents, such as dimethoxyethane, tetrahydrofuran, dioxane, ethers, and benzene, by heating between 30° and 150°C., conveniently at the boiling point of the reaction mixture.

The derivatives of the 1,7-diene addition products where $Z^1$ and $Z^2$ are hydrogen or halogen are prepared by various well-known procedures. The compounds wherein $Z^1$ and $Z^2$ is halogen are prepared by adding a halogen or hydrogen halide molecule across the double bond. The reaction is carried out in a solvent such as chloroform, carbon tetrachloride or ether in the cold.

The compounds wherein $Z^1$ and $Z^2$ both are hydrogens can be obtained by hydrogenation to reduce the double bond. The hydrogenation of carbon to carbon double bonds is well-known to those skilled in the art and may be accomplished in the presence of a proper hydrogenation catalyst. One such catalyst is palladium on carbon, although many other catalysts are possible. The reaction may be conducted at a temperature between 0° and 100°C. and at a pressure of up to 100 psig., preferably at between 20 to 40 psig.

The methods of preparing the compounds of my invention will be further illustrated by the following examples. Each example illustrates a separate step of the reaction sequence. It is to be understood that such examples are merely illustrative and are not intended to limit the scope of the invention in any manner.

EXAMPLE 1

To a solution of 156 g. (1.0 mole) of citronellol in 300 ml. of petroleum ether (b.p. 69°–71°C.) and 25 ml. of dry pyridine at −10°C. was added a solution of 123 g. of phosphorous tribromide (0.50 mole) in 150 ml. petroleum ether dropwise at such a rate as to maintain the temperature with external cooling between −5° and 0°C. The addition required about two hours and the mixture was stirred at 0°C. for an additional two hours. The solution was poured into one liter of ice water and extracted three times with 300 ml. of petroleum ether. The organic extracts were washed with saturated sodium bicarbonate and saturated sodium chloride solutions and dried by passing the solution through a cone of anhydrous sodium sulfate. The petroleum ether was evaporated and the product was fractionally distilled to give 103 g. of citronellyl bromide, b.p. 86°–96°C. at 5 mm. pressure. The product was identified by infrared and nuclear magnetic resonance spectroscopy (NMR).

EXAMPLE 2

Citronellyl magnesium bromide was prepared by the dropwise addition, under nitrogen, of a solution of 105 g. (0.46 mole) of citronellyl bromide in 300 ml. of anhydrous ethyl ether to 12.2 g. (0.5 mole) of elemental magnesium. Following the addition, the reaction mixture was heated at reflux for two hours. A solution of 69 g. (0.46 mole) of piperonal in 250 ml. of anhydrous ethyl ether was added slowly to the cooled Grignard reaction mixture. After the addition was completed, the mixture was heated at reflux for one hour and allowed to equilibrate slowly to room temperature. Saturated ammonium chloride solution (80 ml.) was added to the mixture and the organic layer separated. The ether was washed with 200 ml. of 20 percent sodium bisulfite solution, followed by saturated sodium chloride solution, and dried over sodium sulfate. The ether was removed under reduced pressure. The compound obtained weighed 91.5 g. and was shown by NMR spectroscopy to be about 85 percent pure 4,8-dimethyl-1-(3,4-methylenedioxyphenyl)-7-nonenyl-1-ol. The product was used in the next step without further purification.

EXAMPLE 3

To 14.5 g. (0.05 mole) of 4,8-dimethyl-1-(3,4-methylenedioxyphenyl)-7-nonenyl-1-ol in 75 ml. of dry pyridine was added 19.1 g. (0.1 mole) of p-toluenesulfonyl chloride in 75 ml. of dry pyridine with stirring. The mixture was heated at reflux for two hours and allowed to equilibrate slowly to room temperature. The mixture was poured over 300 ml. of ice water and extracted three times with 300 ml. of ethyl ether. The ether layer was washed with 2 N hydrochloric acid solution, saturated sodium chloride solution, saturated sodium bicarbonate solution and again with saturated sodium chloride solution. The ether layer was then dried over sodium sulfate and the solvent removed under reduced pressure to give 7.0 g. of crude 4,8-dimethyl-1-(3,4-methylenedioxyphenyl)-1,7-nonadiene.

The crude product was purified by chromatographing on a 400 by 45 mm. column containing 150 g. of silica gel using petroleum ether as the eluent. A yield of 1.3 g. of the 4,8-dimethyl-1-(3,4-methylenedioxyphenyl)-1,7-nonadiene was obtained. The compound structure was confirmed by NMR spectroscopy.

EXAMPLE 4

To a solution of 72.6 g. (0.43 mole) of 3,4-methylenedioxybenzyl chloride in 400 ml. of benzene was added 143 ml. (0.86 mole) of triethyl phosphite and the mixture was heated at reflux for 12 hours. The excess triethyl phosphite was removed under reduced pressure at 100°C. The product was distilled at 1 mm. pressure to give 83.9 g. of diethyl 3,4-methylenedioxybenzyl phosphonate boiling between 155°–160°C. The structure of the product was confirmed by NMR spectroscopy.

EXAMPLE 5

Mineral oil was removed from 4.3 g. (0.1 mole) of a 56 percent dispersion of sodium hydride in mineral oil by washing three times with petroleum ether (b.p. 69°–71°C.), and the resulting clean sodium hydride was suspended in 150 ml. of anhydrous dimethoxyethane. To the suspension was added 27.2 g. (0.1 mole) of diethyl 3,4-methylenedioxybenzyl phosphonate in 50 ml. of dimethoxyethane dropwise with stirring at room temperature (about 20°C.). The stirring was continued for two and one-half hours. Citronellal (15.4 g., 0.1 mole) in 50 ml. of dimethoxyethane was added dropwise with stirring at room temperature. The reaction mixture was heated at reflux for three hours. Water (200 ml.) was added and the dimethoxyethane was removed at 50°C. under reduced pressure. The remaining heterogenous mixture was extracted with ethyl ether and the resulting ether layer was washed with water and then with saturated sodium chloride solution and dried over magnesium sulfate. The solvent was removed at reduced pressure to yield 25.0 g. of crude product which was purified by eluting it through a column containing 500 g. silica gel with petroleum ether. Nine grams of pure 4,8-dimethyl-1-(3,4-methylenedioxyphenyl)-1,7-nonadiene was obtained. The structure was confirmed by NMR spectroscopy. Gas chromatographic analysis indicated the compound to be 99 percent trans isomer and one percent cis isomer. Other compounds prepared by this method, including 4,8-dimethyl-1-(4-chlorophenyl)-1,7-nonadiene, 4,8-dimethyl-1-(4-bromophenyl)-1,7-nonadiene and 4,8-dimethyl-1-(4-methoxyphenyl)-1,7-nonadiene, were also obtained as the pure trans isomers.

In a demonstration of the ability of my compounds to inhibit the maturation of insects, the compounds were applied topically to insects, at an early metamorphic stage, of four different species. The compounds were applied in acetone solution at concentrations of ten percent, one percent and 0.5 percent. One microliter of an acetone solution was applied to each test specimen. Each concentration was applied to ten test specimens of each species and compared to ten acetone controls and ten zero controls. Approximately eight to ten days later, the specimens were observed.

The insect species used in the test were *Tenebrio molitor* pupae; milkweed bug, fourth nymphal stage; wax moth, fifth larval stage; and Mexican bean beetle, fourth larval stage. At the completion of the test, each specimen was examined for the degree of its juvenile and adult characteristics. The milkweed bug, wax moth, and Mexican bean beetle were assigned a numerical rating of 0 to 3 with 0 indicating no effect and 3 indicating the maximum effect or least adult development. Because of differences in morphology the Tenebrio rating scale was 0 to 4. In all cases a rating of 2 or higher means that the insect is incapable of reproduction. The number of specimens in each rating classification are given. The results for the compounds tested are summarized in the following tables. In any test where the total of specimens reported is less than 10, those unreported died in some metamorphic stage. Such deaths indicate control, since the dead insects are not capable of reproducing.

trans-4,8-Dimethyl-1-(3,4-methylenedioxyphenyl)-1,7-nonadiene

| Insect | Conc.,% | Rating 0 | 1 | 2 | 3 | 4 |
|---|---|---|---|---|---|---|
| Tenebrio | 10 | — | — | — | — | 10 |
| | 1 | — | — | — | — | 10 |
| | 0.5 | — | — | — | — | 10 |
| | acet. | 10 | — | — | — | — |
| | cont. | 10 | — | — | — | — |
| MWB | 10 | — | — | — | 10 | |
| | 1 | — | — | — | 10 | |
| | 0.5 | — | — | — | 10 | |
| | acet. | 10 | — | — | — | |
| | cont. | 10 | — | — | — | |
| WM | 10 | 10 | — | — | — | |
| | 1 | 10 | — | — | — | |
| | 0.5 | 10 | — | — | — | |
| | cont. | 10 | — | — | — | |
| MBB | 10 | — | — | — | 10 | |
| | 1 | — | — | — | 10 | |
| | 0.5 | — | — | — | 10 | |
| | acet. | 10 | — | — | — | |
| | cont. | 10 | — | — | — | | trans-1-(4-Chlorophenyl)-4,8-dimethyl-1,7-nonadiene

| Insect | Conc.,% | Rating 0 | 1 | 2 | 3 | 4 |
|---|---|---|---|---|---|---|
| Tenebrio | 10 | — | — | — | — | 10 |
| | 1 | 1 | 3 | 1 | 5 | — |
| | 0.5 | 7 | 2 | — | 1 | — |
| | acet. | 9 | — | — | — | — |
| | cont. | 8 | 2 | — | — | — |
| MWB | 10 | — | — | — | 10 | |
| | 1 | — | — | — | 9 | |
| | 0.5 | — | — | — | 10 | |
| | acet. | 8 | 1 | — | — | |
| | cont. | 7 | 3 | — | — | |
| WM | 10 | 10 | — | — | — | |
| | 1 | 10 | — | — | — | |
| | 0.5 | 10 | — | — | — | |
| | cont. | 10 | — | — | — | |
| MBB | 10 | — | — | — | 10 | |
| | 1 | — | — | — | 10 | |
| | 0.5 | 2 | 4 | — | 4 | |
| | acet. | 9 | 1 | — | — | |
| | cont. | 10 | — | — | — | | trans-1-(4-Bromophenyl)-4,8-dimethyl-1,7-nonadiene

| Insect | Conc.,% | Rating 0 | 1 | 2 | 3 | 4 |
|---|---|---|---|---|---|---|
| Tenebrio | 10 | — | — | — | — | 10 |
| | 1 | 1 | — | 1 | 7 | — |
| | 0.5 | — | 1 | 2 | 7 | — |
| | acet. | 9 | — | — | — | — |
| | cont. | 9 | — | — | — | — |
| MWB | 10 | — | — | — | 10 | |
| | 1 | — | — | — | 10 | |
| | 0.5 | — | — | — | 10 | |
| | acet. | 9 | — | — | 1 | |
| | cont. | 10 | — | — | — | |
| WM | 10 | 10 | — | — | — | |
| | 1 | 10 | — | — | — | |
| | 0.5 | 10 | — | — | — | |
| | cont. | 10 | — | — | — | |

| | Continued | | | | |
|---|---|---|---|---|---|
| trans-4,8-Dimethyl-1-(3,4-methylenedioxyphenyl)-1,7-nonadiene | | | | | |
| | | Rating | | | |
| Insect | Conc.,% | 0 | 1 | 2 | 3 | 4 |
| MBB | 10 | — | — | — | — | 10 |
| | 1 | — | 2 | 1 | — | 6 |
| | 0.5 | 1 | 4 | 1 | — | 3 |
| | acet. | 10 | — | — | — | — |
| | cont. | 10 | — | — | — | — |

| | trans-1-(4-Methoxyphenyl)-4,8-dimethyl-1,7-nonadiene | | | | |
|---|---|---|---|---|---|
| | | Rating | | | |
| Insect | Conc.,% | 0 | 1 | 2 | 3 | 4 |
| Tenebrio | 10 | — | — | — | — | 10 |
| | 1 | — | 2 | 2 | 5 | 1 |
| | 0.5 | — | 8 | 2 | — | — |
| | acet. | 9 | — | — | — | — |
| | cont. | 10 | — | — | — | — |
| MWB | 10 | — | — | — | 7 | — |
| | 1 | 6 | — | 1 | 1 | — |
| | 0.5 | 9 | — | — | — | — |
| | acet. | 10 | — | — | — | — |
| | cont. | 10 | — | — | — | — |
| WM | 10 | 10 | — | — | — | — |
| | 1 | 10 | — | — | — | — |
| | 0.5 | 10 | — | — | — | — |
| | cont. | 10 | — | — | — | — |
| MBB | 10 | — | — | 1 | 9 | — |
| | 1 | 7 | 3 | — | — | — |
| | 0.5 | 7 | 1 | — | 2 | — |
| | acet. | 10 | — | — | — | — |
| | cont. | 10 | — | — | — | — |

One important distinction between my novel 1,7-nonadienes and previously reported 2,6-nonadienes as juvenile hormone mimics is the greater soil stability of the 1,7-nonadienes. A stability study was run in a clay loam soil with the moisture content maintained at approximately 50 percent of field capacity. The test compounds, 2,6-dimethyl-9-(3,4-methylenedioxyphenyl)-2,6-nonadiene [III] and 4,8-dimethyl-1-(3,4-methylenedioxyphenyl)-1,7-nonadiene [IV], were incorporated in the soil and analyzed by gas chromatography at various intervals over a one-month span. The percent trans isomers recovered are given in Table I. The trans isomers were used because they are the more active isomers, and the methods of preparation yielded either pure trans isomer or predominantly trans isomer.

TABLE I

| Time | III Percent of trans Isomer Recovered | IV Percent of trans Isomer Recovered |
|---|---|---|
| 0 | 84.0 | 107.2 |
| 3-Day | 63.2 | 95.4 |
| 8-Day | 15.9 | 74.8 |
| 15-Day | 4.5 | 50.5 |
| 21-Day | 1.4 | 29.8 |
| 28-Day | 3.2 | 19.5 |

The results in Table I show that compound IV has greater soil stability than compound III. The difference is particularly apparent by the 15th day of the study at which time 50.5 percent of compound IV (1,7-nonadiene) was still present, while only 4.5 percent of compound III (2,6-nonadiene) was recoverable. This increased soil persistence could obviously prolong the activity of the 1,7-nonadiene derivatives as compared to the 2,6-nonadiene derivatives.

I claim:

1. A compound having the formula

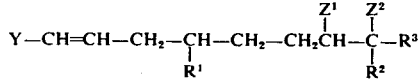

wherein each of $R^1$, $R^2$ and $R^3$ is independently methyl or ethyl; $Z^1$ and $Z^2$ together are a carbon to carbon bond; and Y represents 3,4-methylenedioxyphenyl or 3,4-ethylenedioxyphenyl.

2. The compound of claim 1 wherein each of $R^1$, $R^2$ and $R^3$ is methyl, $Z^1$ and $Z^2$ together are a carbon to carbon bond, and Y is 3,4-methylenedioxyphenyl.

* * * * *

UNITED STATES PATENT OFFICE
CERTIFICATE OF CORRECTION

Patent No. 3,923,832  Dated 12-2-75

Inventor(s) Eric Jan Leopold

It is certified that error appears in the above-identified patent and that said Letters Patent are hereby corrected as shown below:

Column 1, line 17, --a series of synthetically prepared compound having-- should appear below the drawings of Juvenile Hormones I and II.

Column 11, lines 2 and 3 "trans-4,8-Dimethyl-1-(3,4-methylene-dioxyphenyl)-1,7-nonadiene" should read --trans-1-(4-Bromophenyl)-4,8-dimethyl-1,7-nonadiene--.

Signed and Sealed this sixteenth Day of March 1976

[SEAL]

Attest:

RUTH C. MASON
Attesting Officer

C. MARSHALL DANN
Commissioner of Patents and Trademarks